United States Patent
Xiu et al.

(10) Patent No.: US 12,137,244 B2
(45) Date of Patent: Nov. 5, 2024

(54) BIT-WIDTH CONTROL FOR BI-DIRECTIONAL OPTICAL FLOW

(71) Applicant: BEIJING DAJIA INTERNET INFORMATION TECHNOLOGY CO., LTD., Beijing (CN)

(72) Inventors: Xiaoyu Xiu, San Diego, CA (US); Yi-Wen Chen, San Diego, CA (US); Xianglin Wang, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/219,089

(22) Filed: Jul. 6, 2023

(65) Prior Publication Data

US 2023/0353780 A1  Nov. 2, 2023

Related U.S. Application Data

(63) Continuation of application No. 17/726,523, filed on Apr. 21, 2022, now Pat. No. 11,743,493, which is a
(Continued)

(51) Int. Cl.
*H04N 19/577* (2014.01)
*H04N 19/103* (2014.01)
(Continued)

(52) U.S. Cl.
CPC ......... *H04N 19/577* (2014.11); *H04N 19/103* (2014.11); *H04N 19/176* (2014.11); *H04N 19/513* (2014.11)

(58) Field of Classification Search
None
See application file for complete search history.

(56) References Cited

U.S. PATENT DOCUMENTS 10,986,367 B2   4/2021  Lee
11,388,436 B2 *  7/2022  Xiu ..................... H04N 19/577
(Continued)

FOREIGN PATENT DOCUMENTS

CN   107787583 A   3/2018
CN   107925775 A   4/2018
(Continued)

OTHER PUBLICATIONS

International Search Report of PCT Application No. PCT/US2020/012338 dated Apr. 27, 2020, (2p).
(Continued)

*Primary Examiner* — Christopher G Findley
(74) *Attorney, Agent, or Firm* — Arch & Lake LLP

(57) ABSTRACT

A method for controlling bit-width for bi-directional optical flow (BDOF) for video coding includes decoding a first reference picture and a second reference picture, the second reference picture being different than the first reference picture, wherein the first reference picture is displayed before a current picture and the second reference picture is displayed after the current picture. A motion refinement of a coding unit (CU) is calculated by minimizing a difference between a first prediction $L_0$ and a second prediction $L_1$. First gradient values for the first prediction $L_0$ and second gradient values for the second prediction $L_1$ are calculated. A final bi-prediction of the CU is calculated. Also disclosed are an associated apparatus and an associated non-transitory computer readable storage medium.

18 Claims, 4 Drawing Sheets

Related U.S. Application Data continuation of application No. 17/368,468, filed on Jul. 6, 2021, now Pat. No. 11,388,436, which is a continuation of application No. PCT/US2020/012338, filed on Jan. 6, 2020.

(60) Provisional application No. 62/788,898, filed on Jan. 6, 2019.

(51) Int. Cl.
*H04N 19/176* (2014.01)
*H04N 19/513* (2014.01)

(56) References Cited

U.S. PATENT DOCUMENTS

| | | | |
|---|---|---|---|
| 11,743,493 B2* | 8/2023 | Xiu | H04N 19/577 |
| 2016/0057420 A1 | 2/2016 | Pang et al. | |
| 2017/0347128 A1 | 11/2017 | Panusopone et al. | |
| 2018/0249172 A1 | 8/2018 | Chen et al. | |
| 2019/0110058 A1 | 4/2019 | Chien et al. | |
| 2019/0238883 A1 | 8/2019 | Chen et al. | |
| 2021/0127133 A1 | 4/2021 | Chen et al. | |

FOREIGN PATENT DOCUMENTS

| | | |
|---|---|---|
| CN | 108028929 A | 5/2018 |
| EP | 3413563 A1 | 12/2018 |
| EP | 3739885 A1 | 11/2020 |
| KR | 20180061281 A | 6/2018 |
| KR | 20180107761 A | 10/2018 |
| KR | 20180119084 A | 11/2018 |
| KR | 20180129860 A | 12/2018 |
| KR | 20190024553 A | 3/2019 |
| WO | 2017138417 A1 | 8/2017 |
| WO | 2018048265 A1 | 3/2018 |
| WO | 2018113658 A1 | 6/2018 |
| WO | 2018166357 A1 | 9/2018 |
| WO | 2018230493 A1 | 12/2018 |
| WO | 2020264221 A1 | 12/2020 |

OTHER PUBLICATIONS

Xiaoyu Xiu, et al., "CE9-related: Complexity Reduction and Bit-Width Control For Bi-Directional Optical Flow (BIO)", Joint Video Experts Team (JVET) of ITU-T SG 16 WP 3 and ISO/IEC JTC 1/SC 29/WG 11, JVET-L0256_v2, 12th Meeting: Macao, CN, Oct. 3-12, 2018, (15p).

Xiu, Xiaoyu, et al., InterDigital Communications, Inc., CE9-related: Complexity Reduction and Bit-Width Control For Bi-Directional Optical Flow (BIO), Input document to JVET, Proposal; JVET-L0256, ITU-T SG 16 WP 3 and ISO/IEC JTC 1/SC 29/WG 11, 12th Meeting: Macao, China, Oct. 3-12, 2018, (13p).

Chen, Jianle, et al., "Algorithm Description for Versatile Video Coding and Test Model 3 (VTM 3)", Joint Video Experts Team (JVET) of ITU-T SG 16 WP 3 and ISO/IEC JTC 1/SC 29/WG 11, 12th Meeting: Macao, CN, Oct. 3-12, 2018, (5p).

Chujoh, Takeshi, et al., "Non-CE9: An Improvement of BDOF", Joint Video Experts Team (JVET) of ITU-T SG 16 WP 3 and ISO/IEC JTC 1/SC 29/WG 11, 13th Meeting: Marrakech, MA, Jan. 9-18, 2019, (4p).

European Search Report of EP Application No. 20736085.0 dated May 18, 2022, (4p).

Qi Lin, et al., "Fast Inter Prediction Algorithm for AVS2" [J]. TV Engineering, dated on Mar. 29, 2014,38(17), (5p).

Philipp Kratzer, et al., "Towards Combining Motion Optimization and Data Driven Dynamical Models for Human Motion Prediction" 2018 IEEE-RAS 18th International Conference on Humanoid Robots (Humanoids) Beijing, China, Nov. 6-9, 2018, (7p).

Mingyu Li, "Research on Video Stabilization algorithm based on Coding theory", a master thesis submitted to University of Electronic Science and Technology of China, dated on Mar. 31, 2017, (71p).

* cited by examiner

BIT-WIDTH CONTROL FOR BI-DIRECTIONAL OPTICAL FLOW

CROSS-REFERENCE TO RELATED APPLICATIONS

This application is a continuation of U.S. patent application Ser. No. 17/726,523 filed Apr. 21, 2022, which is a continuation of U.S. application Ser. No. 17/368,468 filed on Jul. 6, 2021, which is a continuation of PCT Application PCT/US2020/012338 filed Jan. 6, 2020, which is based on and claims the benefit of U.S. Provisional Application No. 62/788,898 filed on Jan. 6, 2019, the entire disclosures of which are incorporated herein by reference for all purposes.

FIELD

The present disclosure relates generally to coding (e.g., encoding and decoding) video data. More specifically, this disclosure relates to methods and apparatus for improving bi-directional optical flow (BDOF) processing methods for video coding. In particular example embodiments, methods are described by which a block is bi-directionally predicted from reference pictures that occur in opposite directions with respect to a current picture (e.g., a first reference picture having display order before the current picture and a second reference picture having display order after the current picture) using BDOF.

BACKGROUND

This section provides background information related to the present disclosure. The information contained within this section should not necessarily be construed as prior art.

Various video coding techniques may be used to compress video data. Video coding is performed according to one or more video coding standards. For example, video coding standards include versatile video coding (VVC), joint exploration test model coding (JEM), high-efficiency video coding (H.265/HEVC), advanced video coding (H.264/AVC), moving picture experts group coding (MPEG), or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements over its predecessor, there is evidence that superior coding efficiency can be achieved with additional coding tools over HEVC. Based on that, both VCEG and MPEG started the exploration work of new coding technologies for future video coding standardization. One Joint Video Exploration Team (JVET) was formed in October 2015 by ITU-T VECG and ISO/IEC MPEG to begin significant study of advanced technologies that could enable substantial enhancement of coding efficiency. The JVET developed a reference software called joint exploration model (JEM) by integrating several additional coding tools on top of the HEVC test model (HM).

In October 2017, ITU-T and ISO/IEC issued a joint call for proposals (CfP) on video compression with capability beyond HEVC. In April 2018, 23 CfP responses were received and evaluated at the 10-th JVET meeting, which demonstrated compression efficiency gain over the HEVC of around 40%. Based on such evaluation results, the JVET launched a new project to develop the new generation video coding standard named Versatile Video Coding (VVC). In the same month, one reference software codebase, called VVC test model (VTM), was established for demonstrating a reference implementation of the VVC standard.

SUMMARY

This section provides a general summary of the disclosure, and is not a comprehensive disclosure of its full scope or all of its features.

According to a first aspect of the present disclosure, a method for controlling bit-width for bi-directional optical flow (BDOF) for video coding, performed at a computing device having one or more processors and memory storing a plurality of programs to be executed by the one or more processors, includes decoding a first reference picture and a second reference picture. The second reference picture being different than the first reference picture, wherein the first reference picture is displayed before a current picture and the second reference picture is displayed after the current picture. A first motion vector ($MV_0$) is determined from a current block of the current picture to a first prediction $L_0$ of the first reference picture. A second motion vector ($MV_1$) is determined from the current block to a second prediction $L_1$ of the second reference picture. A first temporal distance ($\tau_0$) is determined from the current picture to the first reference picture and a second temporal distance ($\tau_1$) is determined from the current picture to the second reference picture. A motion refinement is calculated by minimizing a difference between the first prediction $L_0$ and the second prediction $L_1$. A first gradient value and a second gradient value are calculated, wherein an additional right shift is introduced to lower an internal bit-width of the first gradient value and the second gradient value. The summation of the first gradient value and the second gradient value is calculated, wherein an additional right shift is introduced to the summation to lower its bit-width. The difference between the first prediction sample $L_0$ and the second prediction sample $L_1$ is calculated, wherein an additional right shift is introduced to the first prediction sample $L_0$ and the second prediction sample $L_1$ to lower an internal bit-width of the difference.

According to a second aspect of the present disclosure, a computing device includes one or more processors, a non-transitory storage coupled to the one or more processors, and a plurality of programs stored in the non-transitory storage. When the plurality of programs are executed by the one or more processors, the computing device decodes a first reference picture and a second reference picture. The second reference picture is different than the first reference picture, wherein the first reference picture is displayed before a current picture and the second reference picture is displayed after the current picture. A first motion vector ($MV_0$) is determined from a current block of the current picture to a first prediction $L_0$ of the first reference picture. A second motion vector ($MV_1$) is determined from the current block to a second prediction $L_1$ of the second reference picture. A first temporal distance ($\tau_0$) is determined from the current picture to the first reference picture and a second temporal distance ($\tau_1$) is determined from the current picture to the second reference picture. A motion refinement is calculated by minimizing a difference between the first prediction $L_0$ and the second prediction $L_1$. A first gradient value and a second gradient value are calculated, wherein an additional right shift is introduced to lower an internal bit-width of the first gradient value and the second gradient value. The summation of the first gradient value and the second gradient value is calculated, wherein an additional right shift is introduced to the summation to lower its bit-width. The difference between the first prediction sample $L_0$ and the second prediction sample $L_1$ is calculated, wherein an additional right shift is introduced to the first prediction sample $L_0$ and the second prediction sample $L_1$ to lower an internal bit-width of the difference.

According to a third aspect of the present disclosure, a non-transitory computer readable storage medium stores a plurality of programs for execution by a computing device having one or more processors. The plurality of programs, when executed by the one or more processors, cause the computing device to decode a first reference picture and a second reference picture. The second reference picture is different than the first reference picture, wherein the first reference picture is displayed before a current picture and the second reference picture is displayed after the current picture. A first motion vector ($MV_0$) is determined from a current block of the current picture to a first prediction $L_0$ of the first reference picture. A second motion vector ($MV_1$) is determined from the current block to a second prediction $L_1$ of the second reference picture. A first temporal distance ($\tau_0$) is determined from the current picture to the first reference picture and a second temporal distance ($\tau_1$) is determined from the current picture to the second reference picture. A motion refinement is calculated by minimizing a difference between the first prediction $L_0$ and the second prediction $L_1$. A first gradient value and a second gradient value are calculated, wherein an additional right shift is introduced to lower an internal bit-width of the first gradient value and the second gradient value. The summation of the first gradient value and the second gradient value is calculated, wherein an additional right shift is introduced to the summation to lower its bit-width. The difference between the first prediction sample $L_0$ and the second prediction sample $L_1$ is calculated, wherein an additional right shift is introduced to the first prediction sample $L_0$ and the second prediction sample $L_1$ to lower an internal bit-width of the difference.

BRIEF DESCRIPTION OF THE DRAWINGS

Hereinafter, sets of illustrative, non-limiting embodiments of the present disclosure will be described in conjunction with the accompanying drawings. Variations of structure, method, or functionality may be implemented by those of ordinary skill in the relevant art based on the examples presented herein, and such variations are all contained within the scope of the present disclosure. In cases where no conflict is present, the teachings of different embodiments may, but need not, be combined with one another.

DETAILED DESCRIPTION

Figure 1:
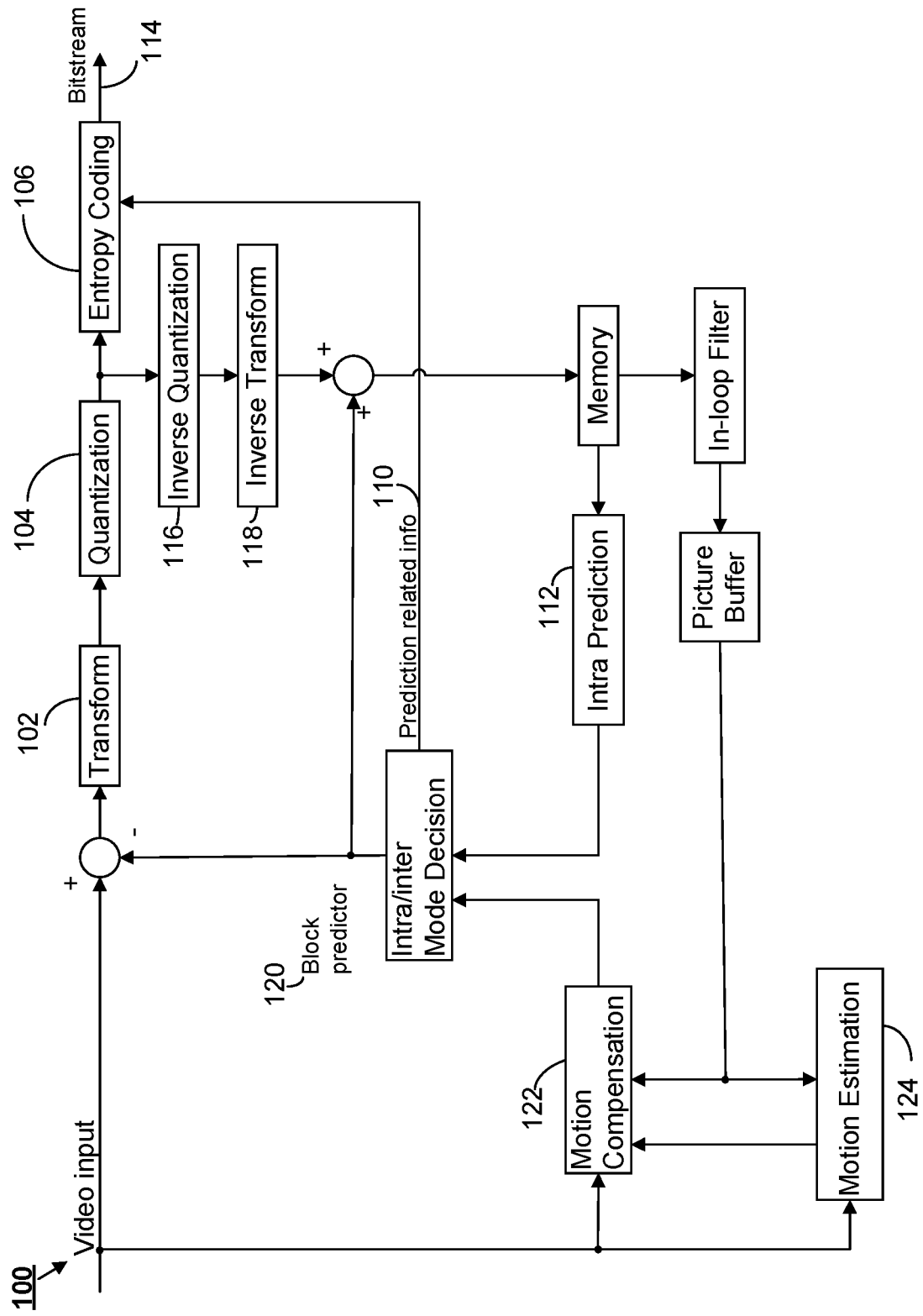
FIG. 1 is a block diagram of an example block-based hybrid video encoding system according to example embodiments including an example encoder suitable for use with bi-directional optical flow (BDOF) methods.

The terms used in the present disclosure are directed to illustrating particular examples, rather than to limit the present disclosure. The singular forms "a" "an" and "the" as used in the present disclosure as well as the appended claims also refer to plural forms unless other meanings are definitely contained in the context. It should be appreciated that the term "and/or" as used herein refers to any or all possible combinations of one or more associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to," depending on the context.

Reference throughout this specification to "one embodiment," "an embodiment," "another embodiment," or the like in the singular or plural means that one or more particular features, structures, or characteristics described in connection with an embodiment are included in at least one embodiment of the present disclosure. Thus, the appearances of the phrases "in one embodiment" or "in an embodiment," "in another embodiment," or the like in the singular or plural in various places throughout this specification are not necessarily all referring to the same embodiment. Furthermore, the particular features, structures, or characteristics in one or more embodiments may be combined in any suitable manner.

The present disclosure relates generally to coding (e.g., encoding and decoding) video data. More specifically, this disclosure relates to methods and apparatus for improving bi-directional optical flow (BDOF) processing methods for video coding. In particular example embodiments, methods are described by which, using BDOF, a block is bi-directionally predicted from reference pictures that occur in opposite directions with respect to a current picture (e.g., a first reference picture having display order before the current picture and a second reference picture having display order after the current picture).

The methods as described herein relate to improving or enhancing BDOF. BDOF may be applied during motion compensation and is used to modify a motion vector on a per pixel basis for a current block, such that pixels of the current block are predicted using corresponding offset values applied to the motion vector. In example embodiments, BDOF is used when motion vectors are used to inter-predict a block of video data of a current picture relative to reference blocks in reference pictures in opposite prediction directions with respect to the current block. Video coding methods include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs), and/or coding nodes. Video blocks in an intra-coded (I) slice of a picture may be encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial prediction or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

For each inter-predicted block, a set of motion information may be available. A set of motion information may contain motion information for forward and backward prediction directions. As used herein, a forward or first prediction direction and a backward or second prediction direction are two prediction directions of a bi-directional prediction mode and the terms "forward," "first," "backward," and "second" do not necessarily have a geometry meaning. Rather, these terms generally correspond to whether the reference pictures are to be displayed before ("backward") or after ("forward") the current picture. In example embodiments, the forward prediction direction may correspond to a reference picture list 0 (RefPicList0) and the backward prediction direction may correspond to a reference picture list 1 (RefPicList1) of a current picture.

For each prediction direction, motion information contains a reference index and a motion vector. In example embodiments, a reference index may be used to identify a reference picture in the current reference picture list (RefPicList0 or RefPicList1). A motion vector has a horizontal (x) and a vertical (y) component. In general, the horizontal component indicates a horizontal displacement within a reference picture, relative to the position of a current block in a current picture, for locating an x-coordinate of a reference block, while the vertical component indicates a vertical displacement within the reference picture, relative to the position of the current block, for locating a y-coordinate of the reference block.

Picture order count (POC) values are widely used in video coding standards to identify a display order of a picture. Although in some circumstances two pictures within one coded video sequence may have the same POC value, this typically does not happen within a coded video sequence. Thus, POC values of pictures are generally unique, and thus can uniquely identify corresponding pictures. When multiple coded video sequences are present in a bitstream, pictures having the same POC value may be closer to each other in terms of decoding order. POC values of pictures are typically used for reference picture list construction, derivation of reference picture sets as in HEVC, and motion vector scaling.

Conceptually, many video coding standards are similar, including those previously mentioned in the Background section. For example, virtually all video coding standards use block-based processing and share similar video coding block diagrams to achieve video compression.

Like HEVC, the VVC is built upon the block-based hybrid video coding framework. FIG. 1 is a block diagram of a block-based hybrid video encoding system including an example encoder 100 that may use methods for bi-directional optical flow according to example embodiments. The input video signal is processed block by block (CUs). In VTM-1.0, a CU can be up to 128×128 pixels. However, different from the HEVC which partitions blocks only based on quad-trees, in the VVC, one coding tree unit (CTU) is split into CUs to adapt to varying local characteristics based on quad/binary/ternary-tree. Additionally, the concept of a multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is partitioned by a quad-tree structure and then each quad-tree leaf node may be further partitioned by a binary and ternary tree structure.

Referring to FIG. 1, encoder 100, a video frame is partitioned into a plurality of video blocks for processing. For each given video block, a prediction is formed based on either an inter-prediction approach or an intra-prediction approach. In inter-prediction, one or more predictors are formed through motion estimation and motion compensation, based on pixels from previously reconstructed frames. In intra-prediction, predictors are formed based on reconstructed pixels in a current frame. Through mode decision, a best predictor may be chosen to predict a current block.

A prediction residual, representing the difference between a current video block and its predictor, is sent to a transform circuitry 102. The term "circuitry" as used herein includes hardware and software to operate the hardware. Transform circuitry 102 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. Transform circuitry 102 applies the transform to the residual block, producing a block of transform coefficients. The transform may convert the residual information from a pixel domain to a transform domain, such as a frequency domain.

The resulting transform coefficients are then sent from transform circuitry 102 to a quantization circuitry 104 for entropy reduction. Quantization circuitry 104 quantizes the transform coefficients to further reduce bit rate. The quantization process may reduce the bit depth associated with some or all of the coefficients. The degree of quantization may be modified by adjusting a quantization parameter. Quantized coefficients are then fed to an entropy coding circuitry 106 to generate a compressed video bitstream. Entropy coding circuitry 106 entropy codes the quantized transform coefficients. For example, entropy coding circuitry 106 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. With context-based entropy coding, context may be based on neighboring blocks. Following the entropy coding by entropy coding circuitry 106, the encoded bitstream may be transmitted to another device (e.g., a video decoder) or archived for later transmission or retrieval. As shown in FIG. 1, prediction-related information 110 from an inter-prediction circuitry and/or an intra-prediction circuitry 112, such as video block partition information, motion vectors, a reference picture index, and an intra-prediction mode, are also fed through the entropy coding circuitry 106 and saved into a compressed video bitstream 114.

In encoder 100, decoder-related circuitry is also needed in order to reconstruct pixels for the purpose of prediction. First, a prediction residual is reconstructed through an inverse quantization circuitry 116 and an inverse transform circuitry 118. This reconstructed prediction residual is combined with a block predictor 120 to generate unfiltered reconstructed pixels for a current video block. Inverse quantization circuitry 116 and inverse transform circuitry 18 apply inverse quantization and inverse transformation, respectively, to reconstruct the residual block in the pixel domain. In certain embodiments, a summer adds the reconstructed residual block to the motion compensated prediction block earlier produced by motion compensation circuitry 122 or intra-prediction circuitry 112 to produce a reconstructed video block for storage in a reference picture memory. The reconstructed video block may be used by motion estimation circuitry 124 and motion compensation circuitry 122 as a reference block to inter-code a block in a subsequent video frame.

To improve coding efficiency and visual quality, an in-loop filter is commonly used. For example, a deblocking filter is available in AVC and HEVC, as well as the current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated for incorporation in the final standard. These in-loop filter operations are optional. Performing these operations helps to improve coding efficiency and visual quality. The operations may also be turned off as a decision rendered by encoder 100 to save computational complexity. It should be noted that intra-prediction is usually based on unfiltered reconstructed pixels, while inter-prediction is based on filtered reconstructed pixels if these filter options are turned on by encoder 100.

Figure 2:
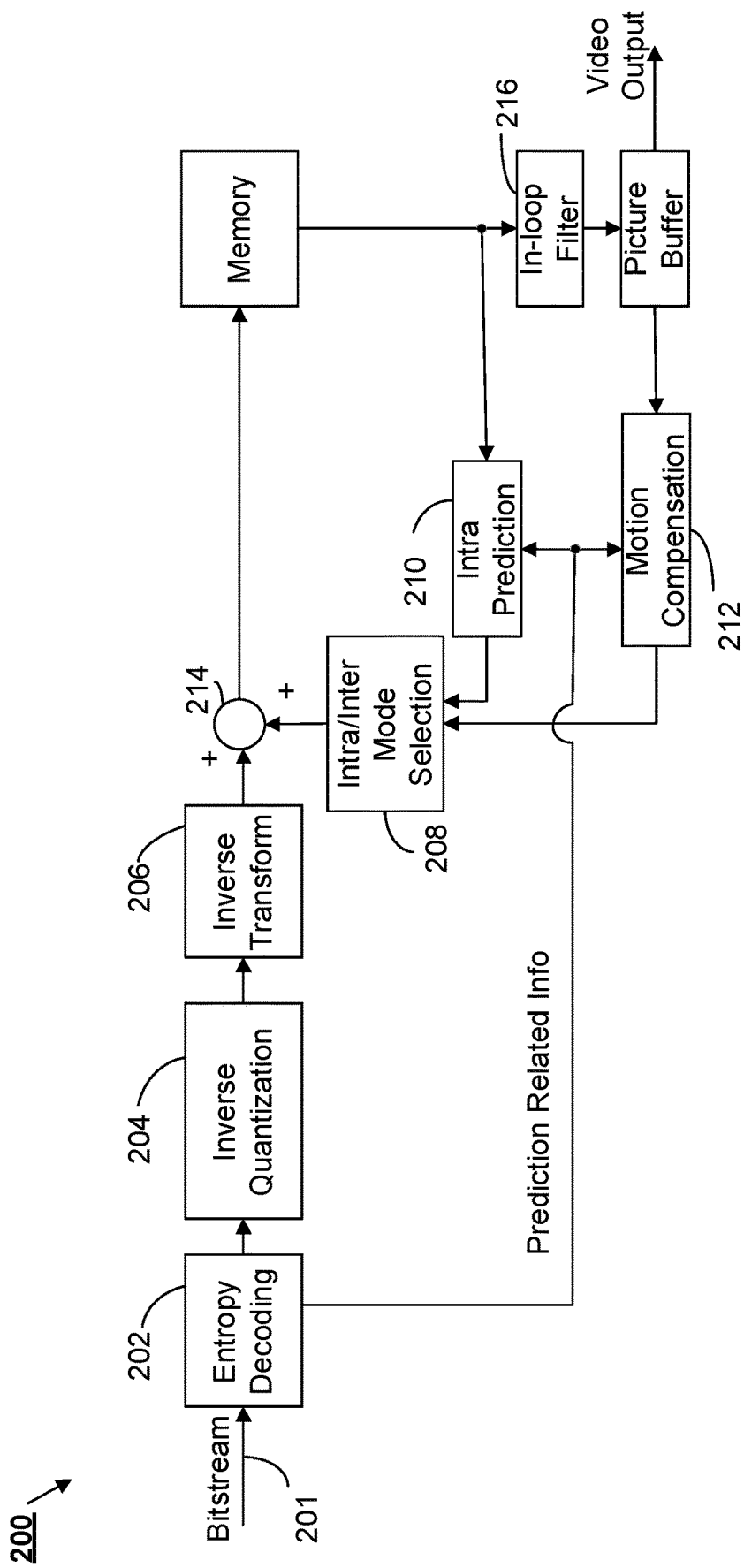
FIG. 2 is a block diagram setting of an example decoder according to example embodiments suitable for use with bi-directional optical flow (BDOF) methods.

FIG. 2 is a block diagram of an example decoder 200 that may use methods for bi-directional optical flow. In example embodiments, decoder 200 is similar to the reconstruction-related section residing in encoder 100 of FIG. 1. Referring to FIG. 2, in decoder 200 an incoming video bitstream 201 is first decoded through an entropy decoding circuitry 202 to derive quantized coefficient levels and prediction-related information. The quantized coefficient levels are then processed through an inverse quantization circuitry 204 and an inverse transform circuitry 206 to obtain a reconstructed prediction residual. Inverse quantization circuitry 204 inverse quantizes, i.e., de-quantizes, the quantized transform coefficients provided in the bitstream and decoded by entropy decoding circuitry 202. The inverse quantization process may include use of a quantization parameter QPy calculated by decoder 200 for each video block in the video slice to determine a degree of quantization and, likewise, a degree of inverse quantization that should be applied. Inverse transform circuitry 206 applies an inverse transform, e.g., an inverse DCT, an inverse integer transform, or a conceptually similar inverse transform process, to the transform coefficients in order to produce residual blocks in the pixel domain.

A block predictor mechanism, which may be implemented in an intra/inter mode selector circuitry 208, includes an intra-prediction circuitry 210 is configured to perform an intra-prediction process and/or a motion compensation circuitry 212 configured to perform a motion compensation process based on decoded prediction information. A set of unfiltered reconstructed pixels are obtained by summing the reconstructed prediction residual from inverse transform circuitry 206 and a predictive output generated by the block predictor mechanism, using a summer 214. In situations where an in-loop filter 216 is turned on, a filtering operation is performed on these reconstructed pixels to derive the final reconstructed video for output.

When the video slice is coded as an intra-coded (I) slice, intra-prediction circuitry 210 may generate prediction data for a video block of the current video slice based on a signaled intra-prediction mode and data from previously decoded blocks of the current frame or picture. When the video frame is coded as an inter-coded (i.e., B, P or GPB) slice, motion compensation circuitry 212 produces predictive blocks for a video block of the current video slice based on the motion vectors and other syntax elements received from entropy decoding circuitry 202. The predictive blocks may be produced from one of the reference pictures within one of the reference picture lists. Decoder 200 may construct the reference frame lists, List 0 and List 1, using default construction techniques based on reference pictures stored in the reference picture memory.

Motion compensation circuitry 212 determines prediction information for a video block of the current video slice by parsing the motion vectors and other syntax elements and uses the prediction information to produce the predictive blocks for the current video block being decoded. For example, motion compensation circuitry 212 uses some of the received syntax elements to determine a prediction mode (e.g., intra-prediction or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation circuitry 212 may also perform interpolation based on interpolation filters for sub-pixel precision. Motion compensation circuitry 212 may use interpolation filters as used by encoder 100 during encoding of the video blocks to calculate interpolated values for sub-integer pixels of reference blocks. In example embodiments, motion compensation circuitry 212 determines the interpolation filters used by encoder 100 from the received syntax elements and uses the interpolation filters to produce predictive blocks. Motion compensation circuitry 212 may be configured to perform any or all of the methods described in this disclosure (alone or in any combination). For example, motion compensation circuitry 212 may be configured to perform the example BDOF methods discussed herein.

In example embodiments, motion compensation circuitry 212 is configured to apply BDOF to blocks that have a first reference picture temporally before the current picture (e.g., in Reference Picture List 0) and a second reference picture temporally after the current picture (e.g., in Reference Picture List 1). In response to determining to apply BDOF to a block, motion compensation circuitry 212 may apply the methods discussed herein (e.g., with respect to the formulas described herein) to predict the block according to BDOF.

Figures 3A, 3B, 3C:
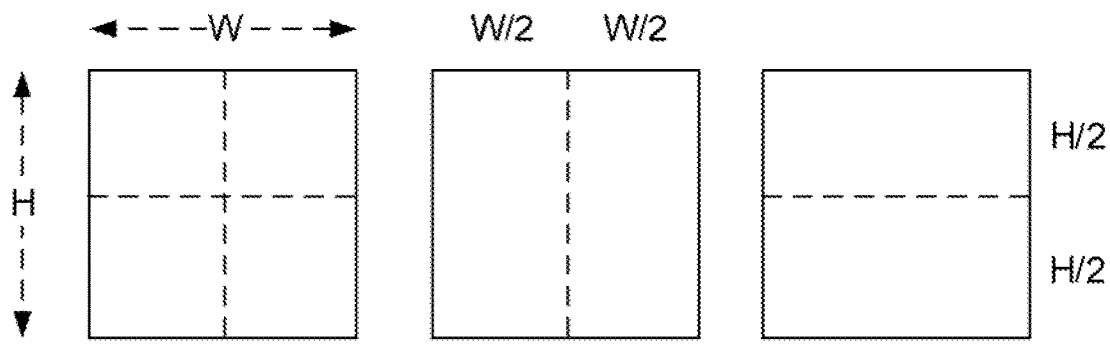
FIGS. 3A-3E show example splitting types, namely, quaternary partitioning (FIG. 3A), horizontal binary partitioning (FIG. 3B), vertical binary partitioning (FIG. 3C), horizontal ternary partitioning (FIG. 3D), and vertical ternary partitioning (FIG. 3E), according to example embodiments.
Figures 3D, 3E:
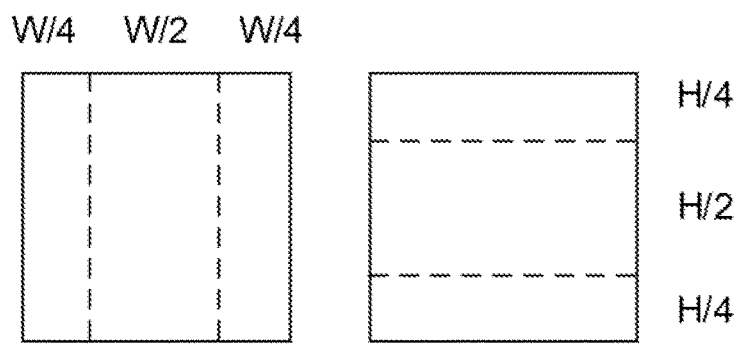

FIGS. 3A-3E shows five example splitting types, namely, quaternary partitioning (FIG. 3A), horizontal binary partitioning (FIG. 3B), vertical binary partitioning (FIG. 3C), horizontal ternary partitioning (FIG. 3D), and vertical ternary partitioning (FIG. 3E).

Referring again to FIG. 1, spatial prediction and/or temporal prediction may be performed. Spatial prediction (or "intra-prediction") uses pixels from the samples of already coded neighboring blocks (which are called reference samples) in the same video picture or slice to predict the current video block. Spatial prediction reduces spatial redundancy inherent in the video signal. Temporal prediction (also referred to as "inter-prediction" or "motion compensated prediction") uses reconstructed pixels from the already coded video pictures to predict the current video block. Temporal prediction reduces temporal redundancy inherent in the video signal. A temporal prediction signal for a given CU is usually signaled by one or more motion vectors (MVs) which indicate an amount and a direction of motion between the current CU and the current CU's temporal reference. Also, if multiple reference pictures are supported, one reference picture index is additionally sent, which is used to identify from which reference picture in the reference picture store the temporal prediction signal comes. After spatial and/or temporal prediction, the mode decision block in the encoder chooses the best prediction mode, for example based on the rate-distortion optimization method. The prediction block is then subtracted from the current video block and the prediction residual is de-correlated using transform and quantized. The quantized residual coefficients are inverse quantized and inverse transformed to form the reconstructed residual, which is then added back to the prediction block to form the reconstructed signal of the CU. Further in-loop filtering, using a deblocking filter, such as a sample adaptive offset (SAO) and adaptive in-loop filter (ALF) for example, may be applied to the reconstructed CU before the reconstructed CU is placed in the reference picture store and used to code future video blocks. To form the output video bit-stream, a coding mode (inter or intra), prediction mode information, motion information, and quantized residual coefficients are all sent to entropy coding circuitry 106 to be further compressed and packed to form the bit-stream.

Figure 4:
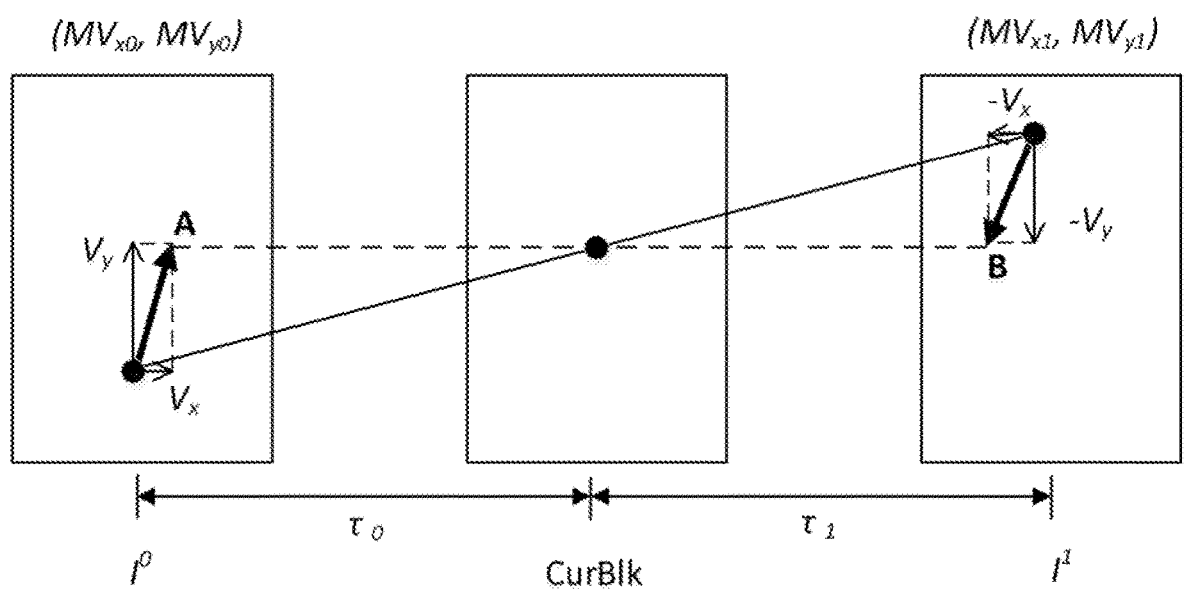
FIG. 4 shows an example bi-directional optical flow (BDOF) model.

FIG. 4 shows an example bi-directional optical flow (BDOF) model. As shown in FIG. 4, a first prediction, $L_0$, in a first reference block, $I_0$, is positioned at a first temporal distance, $\tau_0$, from a current block, CurBlk, for which the prediction is performed. A first motion vector, A, having motion vector components, $(V_x, V_y)$, is located in first reference block $I_0$. Similarly, a second prediction, $L_1$, in a second reference block, $I_1$, is positioned at a second temporal distance, $\tau_1$, from the current block. A second motion vector, B, having motion vector components, $(-V_x, -V_y)$, is located in second reference block $I_1$.

Bi-Directional Optical Flow: Conventional bi-prediction in video coding is a simple combination of two temporal prediction blocks obtained from the reference pictures that are already reconstructed. However, due to the limitation of the block-based motion compensation, there may be remaining small motion that can be observed between the samples of two prediction blocks, thus reducing the efficiency of motion compensated prediction. To solve this problem, bi-directional optical flow (BDOF) is applied in the VVC to lower the impact of such motion for every sample inside one block. More specifically, as shown in FIG. 4, the BDOF is sample-wise motion refinement that is performed on top of the block-based motion-compensated predictions when bi-prediction is used. The motion refinement $(v_x, v_y)$ of each 4×4 sub-block is calculated by minimizing a difference between $L_0$ and $L_1$ prediction samples after the BDOF is applied inside one 6×6 window $\Omega$ around the sub-block. More specifically, the value of $(v_x, v_y)$ is derived as:

$$v_x = S_1 > 0 ? \text{clip3}(-th_{BDOF}, th_{BDOF}, -((S_3 \cdot 2^{n_c}) >> \lfloor \log_2 S_1 \rfloor)):0$$

$$v_y = S_5 > 0 ? \text{clip3}(-th_{BDOF}, th_{BDOF}, -((S_6 \cdot 2^{n_c}) - ((v_x S_{2,m}) << n_{S_2} + v_x S_{2,s})/2 >> \lfloor \log_2 S_5 \rfloor)):0, \quad \text{Eq.(1)}$$

where $\lfloor \cdot \rfloor$ is the floor function; clip3 (min, max, x) is a function that clips a given value x inside the range of [min, max]; the symbol >> represents bitwise right shift operation; the symbol << represents bitwise left shift operation; $th_{BDOF}$ is the motion refinement threshold to prevent propagated errors due to irregular local motion, which is equal to $2^{13-BD}$, where BD is the bit-depth of input video. In Eq. (1), $S_{2,m} = S_2 >> n_{S_2}$, $S_{2,s} = S_2 \& (2^{n_s}-1)$.

The values of $S_1$, $S_2$, $S_3$, $S_5$, and $S_6$ are calculated as:

$$S_1 = \Sigma_{(i,j) \in \Omega} \psi_x(i,j) \cdot \psi_x(i,j), S_3 = \Sigma_{(i,j) \in \Omega} \theta(i,j) \cdot \psi_x(i,j)$$

$$S_2 = \Sigma_{(i,j) \in \Omega} \psi_x(i,j) \cdot \psi_x(i,j)$$

$$S_5 = \Sigma_{(i,j) \in \Omega} \psi_y(i,j) \cdot \psi_y(i,j), S_6 = \Sigma_{(i,j) \in \Omega} \theta(i,j) \cdot \psi_y(i,j), \quad \text{Eq.(2)}$$

wherein $\Omega$ is a set of neighboring prediction samples around one subblock of prediction $L_0$ and $L_1$ and where $$\psi_x(i,j) = \left(\frac{\partial I^{(1)}}{\partial x}(i,j) + \frac{\partial I^{(0)}}{\partial x}(i,j)\right) \gg 3 \quad \text{Eq. (3)}$$

$$\psi_y(i,j) = \left(\frac{\partial I^{(1)}}{\partial y}(i,j) + \frac{\partial I^{(0)}}{\partial y}(i,j)\right) \gg 3$$

$$\theta(i,j) = \left(I^{(1)}(i,j) \gg 6\right) - \left(I^{(0)}(i,j) \gg 6\right)$$

where $I^{(k)}(i, j)$ are the prediction sample at sample location (i,j) of the prediction signal in list k, k=0, 1, which are generated at intermediate high precision (i.e., 16-bit);

$$\frac{\partial I^{(k)}}{\partial x}(i,j) \text{ and } \frac{\partial I^{(k)}}{\partial y}(i,j)$$

are the horizontal gradient and the vertical gradient, respectively, of the sample that are obtained by directly calculating the difference between its two neighboring samples, i.e., $$\frac{\partial I^{(k)}}{\partial x}(i,j) = \left(I^{(k)}(i+1,j) - I^{(k)}(i-1,j)\right) \gg 4 \quad \text{Eq. (4)}$$

$$\frac{\partial I^{(k)}}{\partial y}(i,j) = \left(I^{(k)}(i,j+1) - I^{(k)}(i,j-1)\right) \gg 4$$

Based on the motion refinement derived in Eq. (1), the final bi-prediction samples of the CU are calculated by interpolating the $L_0$ prediction and the $L_1$ prediction along the motion trajectory based on the optical flow model, as indicated by:

$$pred_{BDOF}(x, y) = (I^{(0)}(x, y) + I^{(1)}(x, y) + b + o_{offset}) \gg shift \quad \text{Eq. (5)}$$

$$b = rnd\left(\left(v_x\left(\frac{\partial I^{(1)}(x, y)}{\partial x} - \frac{\partial I^{(0)}(x, y)}{\partial x}\right)\right)/2\right) +$$

$$rnd\left(\left(v_y\left(\frac{\partial I^{(1)}(x, y)}{\partial y} - \frac{\partial I^{(0)}(x, y)}{\partial y}\right)\right)/2\right)$$

where shift and $o_{offset}$ are the right shift value and the offset value that are applied to combine the $L_0$ prediction signal and the $L_1$ prediction signal for bi-prediction, which are equal to 15−BD and 1<<(14−BD)+2−(1<<13), respectively. Table 1 illustrates specific bit-widths of intermediate parameters that are involved in the BDOF process. As shown in Table 1, an internal bit-width of the whole BDOF process does not exceed 32-bit. Additionally, the multiplication with the worst possible input happens at the product of $v_x S_{2,m}$ in Eq. (1) with input bit-width of 15-bit and 4-bit, respectively, for $S_{2,m}$ and $v_x$. Therefore, a 15-bit multiplier is sufficient for the BDOF.

TABLE 1

Bit-Widths of Intermediate Parameters of the BDOF in the VVC

| Operation | Parameter | Bit-Width |
|---|---|---|
| $L_0/L_1$ Prediction | $I^{(0)}(i, j), I^{(1)}(i, j)$ | 16 |
| Gradient Derivation | $\frac{\partial I^{(0)}}{\partial x}(i, j), \frac{\partial I^{(0)}}{\partial y}(i, j)$ | 13 |
|  | $\frac{\partial I^{(1)}}{\partial x}(i, j), \frac{\partial I^{(1)}}{\partial y}(i, j)$ | 13 |
| Correlation Parameter Calculation | $\theta(i, j) = (I^{(1)}(i, j) \gg 6) - (I^{(0)}(i, j) \gg 6)$ | 11 |
|  | $\psi_x(i, j) = \left(\frac{\partial I^{(1)}}{\partial x}(i, j) + \frac{\partial I^{(0)}}{\partial x}(i, j)\right) \gg 3$ | 11 |
|  | $\psi_y(i, j) = \left(\frac{\partial I^{(1)}}{\partial y}(i, j) + \frac{\partial I^{(0)}}{\partial y}(i, j)\right) \gg 3$ | 11 |
|  | $\psi_x(i, j) \cdot \psi_x(i, j)$ | 21 |
|  | $\psi_x(i, j) \cdot \psi_y(i, j)$ | 21 |
|  | $\theta(i, j) \cdot \psi_x(i, j)$ | 21 |
|  | $\psi_y(i, j) \cdot \psi_y(i, j)$ | 21 |
|  | $\theta(i, j) \cdot \psi_y(i, j)$ | 21 |
| Summation | $S_1 = \sum_{(i,j)\in\Omega} \psi_x(i, j) \cdot \psi_x(i, j)$ | 27 |
|  | $S_2 = \sum_{(i,j)\in\Omega} \psi_x(i, j) \cdot \psi_y(i, j)$ | 27 |
|  | $S_3 = \sum_{(i,j)\in\Omega} \theta(i, j) \cdot \psi_x(i, j)$ | 27 |
|  | $S_5 = \sum_{(i,j)\in\Omega} \psi_y(i, j) \cdot \psi_y(i, j)$ | 27 |
|  | $S_6 = \sum_{(i,j)\in\Omega} \theta(i, j) \cdot \psi_y(i, j)$ | 27 |
| Motion Refinement Derivation | $v_x = S_1 > 0?$ clip3 $(-\text{th}'_{BIO}, \text{th}'_{BIO}, -((S_3 \cdot 2^3) \gg \lfloor\log_2 S_1\rfloor)) : 0$ | 4 |
|  | $S_{2,m} = S_2 \gg 12$ | 15 |
|  | $s_{2,s} = S_2 \& (2^{12} - 1)$ | 12 |
|  | $((v_x S_{2,m}) \ll 12 + v_x S_{2,s})/2$ | 30 |
|  | $S_6 \cdot 2^3 - (v_x S_{2,m}) \ll 12 + v_x S_{2,s})/2$ | 31 |
|  | $v_y = S_5 > 0?$ clip3 $(-\text{th}'_{BIO}, \text{th}'_{BIO}, -((S_6 \cdot 2^3 - ((v_x S_{2,m}) \ll 12 + v_x S_{2,s})/2) \gg \lfloor\log_2 S_5\rfloor)) : 0$ | 4 |
| Final Bi-Prediction Generation | $v_x \cdot \left(\frac{\partial I^{(1)}}{\partial x}(i, j) - \frac{\partial I^{(0)}}{\partial x}(i, j)\right)$ | 17 |
|  | $v_y \cdot \left(\frac{\partial I^{(1)}}{\partial y}(i, j) - \frac{\partial I^{(0)}}{\partial y}(i, j)\right)$ | 17 |

Although the BDOF may enhance the efficiency of bi-directional prediction, there is opportunity to further improve the design of the BDOF. More specifically, the following issues in the existing BDOF design in VVC for controlling the bit-widths of intermediate parameters are identified in this disclosure.

First, as shown in Table 1, the parameter $\theta(i,j)$ (i.e., the difference between $L_0$ and $L_1$ predictions), and the parameter $\psi_x(i, j)$ and $\psi_y(i, j)$ (i.e., the sum of the horizontal gradient value and the vertical gradient value for $L_0$ and $L_1$) are represented in the same bit-width of 11-bit. Although such method may facilitate an overall control of the internal bit-width for the BDOF, this method may be suboptimal with regards to the precision of the derived motion refinements. This is because as shown in Eq. (4), the gradient values are calculated as a difference between neighboring predictions. Due to the high-pass nature of such process, the derived gradients are less reliable in the presence of noise, e.g., the noise captured in an original video and the coding noise that is generated during the coding process. This means that it may not always be beneficial to represent the gradient values in high bit-width.

Additionally, as shown in Table 1, the maximum bit-width usage of the whole BDOF process occurs with a calculation of the vertical motion refinement $v_y$ where $S_6$ (27-bit) is firstly left-shifted by 3-bit and then is subtracted by $((v_x S_{2,m}) \ll 12 + v_x S_{2,s})/2$ (30-bit). Therefore, the maximum bit-width of the current design is equal to 31-bit. In practical hardware implementation, the coding process with maximum internal bit-width more than 16-bit is usually implemented by 32-bit implementation. Therefore, the existing design does not fully utilize the valid dynamic range of the 32-bit implementation. This may lead to unnecessary precision loss of the motion refinements derived by the BDOF.

Figure 5:
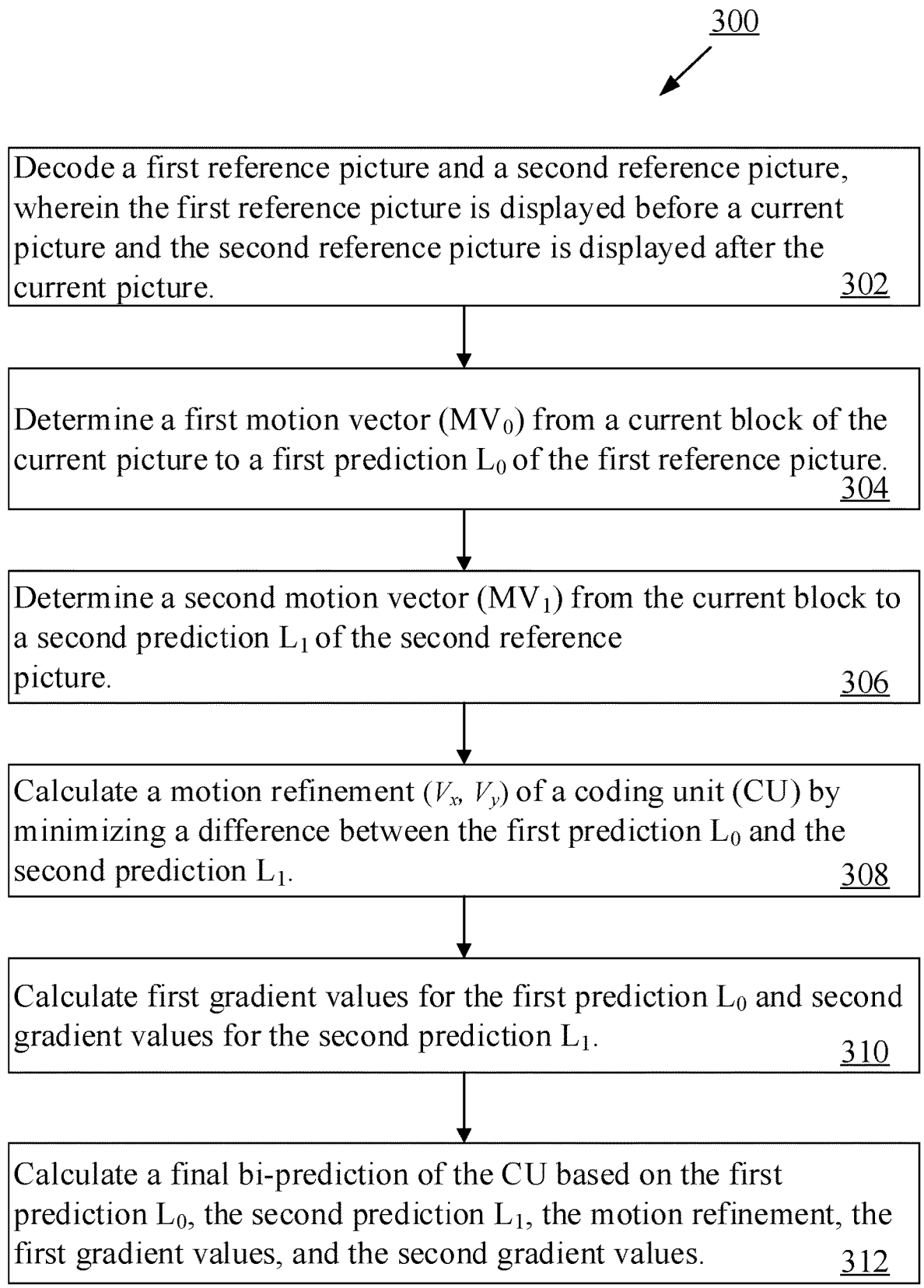
FIG. 5 is a flowchart of an example method for predicting a block of video data according to example embodiments.

In example embodiments, such as the example method as shown in FIG. 5, an example bit-width control method addresses the above issues of the bit-width control method for conventional BDOF design.

Firstly, to overcome the negative impacts of gradient estimation errors, an additional right shift $n_{grad}$ is introduced in an example embodiment when calculating the gradient values $$\frac{\partial I^{(k)}}{\partial x}(i,j) \text{ and } \frac{\partial I^{(k)}}{\partial y}(i,j)$$

in Eq. (4), i.e., to lower the internal bit-width of gradient values. More specifically, the first gradient values, i.e., the horizontal gradient and the vertical gradient, at the first prediction position $$L_0\left(\frac{\partial I^{(0)}}{\partial x}(i,j) \text{ and } \frac{\partial I^{(0)}}{\partial y}(i,j)\right)$$

and the second gradient values, i.e., the horizontal gradient and the vertical gradient, at the second prediction position $$L_1\left(\frac{\partial I^{(1)}}{\partial x}(i,j) \text{ and } \frac{\partial I^{(1)}}{\partial y}(i,j)\right)$$

are calculated as:

$$\frac{\partial I^{(k)}}{\partial x}(i,j) = \left(I^{(k)}(i+1,j) - I^{(k)}(i-1,j)\right) \gg (4 + n_{grad}), k = 0, 1 \quad \text{Eq. (6)}$$

$$\frac{\partial I^{(k)}}{\partial y}(i,j) = \left(I^{(k)}(i,j+1) - I^{(k)}(i,j-1)\right) \gg (4 + n_{grad}), k = 0, 1$$

Moreover, an additional bit-shift $n_{adj}$ is introduced to the calculation of variables $\psi_x(i,j)$, $\psi_y(i,j)$ and $\theta(i,j)$ in order to control the entire BDOF process so that the BDOF process is operated at appropriate internal bit-widths, as depicted as:

$$\psi_x(i,j) = \left(\frac{\partial I^{(1)}}{\partial x}(i,j) + \frac{\partial I^{(0)}}{\partial x}(i,j)\right) \gg (3 - n_{adj}) \quad \text{Eq. (7)}$$

$$\psi_y(i,j) = \left(\frac{\partial I^{(1)}}{\partial y}(i,j) + \frac{\partial I^{(0)}}{\partial y}(i,j)\right) \gg (3 - n_{adj})$$

$$\theta(i,j) = \left(I^{(1)}(i,j) \gg (6 - n_{adj})\right) - \left(I^{(0)}(i,j) \gg (6 - n_{adj})\right).$$

Table 2 below shows the corresponding bit-width of each intermediate parameter when the example bit-width control method is applied to the BDOF. Table 2 shows changes that are applied in the example bit-width control method compared to the conventional BDOF design in VVC. As can be seen in Table 2, with the example bit-width control method, the internal bit-width of the whole BDOF process does not exceed 32-bit. Additionally, by the example method, the maximum bit-width is just 32-bit, which can fully utilize the available dynamic range of 32-bit hardware implementation. Further, as shown in Table 2, the multiplication with the worst possible input happens at the product of $v_x S_{2,m}$ where the input $S_{2,m}$ is 14-bit and the input $v_x$ is 6-bit. Therefore, like conventional BDOF methods, one 16-bit multiplier is also sufficiently large when the example method is applied.

Referring to Table 2, due to the modification to the number of right-shifted bits that are applied in Eq. (6) and Eq. (7), the dynamic ranges of the parameters $\psi_x(i,j)$, $\psi_y(i,j)$ and $\theta(i,j)$ are different, compared to conventional BDOF methods shown in Table 1, where the three parameters are represented in the same dynamic range (i.e., 21-bit). Such change may increase the bit-widths of the internal parameters $S_1$, $S_2$, $S_3$, $S_5$, and $S_6$, which may potentially increase the maximum bit-width of the internal BDOF process to greater than 32-bit. Thus, to ensure a 32-bit implementation, two additional clipping operations are introduced in calculating the values of $S_2$ and $S_6$. More specifically, in the example method, the values of two parameters are calculated as:

$$S_2 = \text{Clip3}(-2^{B_2}, 2^{B_2}-1, \Sigma_{(i,j)\in\Omega}\psi_x(i,j)\cdot\psi_y(i,j))$$

$$S_6 = \text{Clip3}(-2^{B_6}, 2^{B_6}-1, \Sigma_{(i,j)\in\Omega}\theta(i,j)\cdot\psi_y(i,j)) \quad \text{Eq.(8)}$$

wherein $B_2$ and $B_6$ are the parameters to control the output dynamic ranges of $S_2$ and $S_6$, respectively. It should be noticed that different from the gradient calculation the clipping operations in Eq. (8) are only applied once to calculate the motion refinement of each 4×4 sub-block inside one BDOF CU, i.e., being invoked based on the 4×4 unit. Therefore, the corresponding complexity increase due to the clipping operations introduced in the proposed method is very negligible.

In example embodiments, the final bi-prediction of the CU is calculated based on the first prediction $L_0$ and the second prediction $L_1$, the motion refinement $(v_x, v_y)$ and the first gradient values $$\frac{\partial I^{(0)}}{\partial x}(i,j) \text{ and } \frac{\partial I^{(0)}}{\partial y}(i,j)$$

and second gradient values $$\frac{\partial I^{(1)}}{\partial x}(i,j) \text{ and } \frac{\partial I^{(1)}}{\partial y}(i,j).$$

In practice, different values of $n_{grad}$, $n_{adj}$, $B_2$, and $B_6$ may be applied to achieve different trade-offs between the intermediate bit-width and the precision of internal BDOF derivations. In one example embodiment, $n_{grad}$ and $n_{adj}$ are set to 2, $B_2$ is set to 25 and $B_6$ is set to 27. In certain example embodiments, the value of $n_c$ is set equal to 2 and/or $th_{BDOF}$ is set equal to 2 (see Eq. (1)), for example.

TABLE 2

Bit-Widths of Intermediate Parameters of Example Method

| Operation | Parameter | Bit-Width |
|---|---|---|
| $L_0/L_1$ Prediction | $I^{(0)}(i,j), I^{(1)}(i,j)$ | 16 |
| Gradient Derivation | $\frac{\partial I^{(0)}}{\partial x}(i,j), \frac{\partial I^{(0)}}{\partial y}(i,j)$ | 11 |
| | $\frac{\partial I^{(1)}}{\partial x}(i,j), \frac{\partial I^{(1)}}{\partial y}(i,j)$ | 11 |

TABLE 2-continued

Bit-Widths of Intermediate Parameters of Example Method

| Operation | Parameter | Bit-Width |
|---|---|---|
| Correlation Parameter Calculation | $\theta(i, j) = (I^{(1)}(i, j) \gg 4) - (I^{(0)}(i, j) \gg 4)$ | 13 |
| | $\psi_x(i, j) = \left(\dfrac{\partial I^{(1)}}{\partial x}(i, j) + \dfrac{\partial I^{(0)}}{\partial x}(i, j)\right) \gg 1$ | 11 |
| | $\psi_y(i, j) = \left(\dfrac{\partial I^{(1)}}{\partial y}(i, j) + \dfrac{\partial I^{(0)}}{\partial y}(i, j)\right) \gg 1$ | 11 |
| | $\psi_x(i, j) \cdot \psi_x(i, j)$ | 21 |
| | $\psi_x(i, j) \cdot \psi_y(i, j)$ | 21 |
| | $\theta(i, j) \cdot \psi_x(i, j)$ | 23 |
| | $\psi_y(i, j) \cdot \psi_y(i, j)$ | 21 |
| | $\theta(i, j) \cdot \psi_y(i, j)$ | 23 |
| Summation | $S_1 = \sum_{(i,j)\in\Omega} \psi_x(i, j) \cdot \psi_x(i, j)$ | 27 |
| | $S_2 = \text{Clip3}\left(-2^{25}, 2^{25} - 1, \sum_{(i,j)\in\Omega} \psi_x(i, j) \cdot \psi_y(i, j)\right)$ | 26 |
| | $S_3 = \sum_{(i,j)\in\Omega} \theta(i, j) \cdot \psi_x(i, j)$ | 29 |
| | $S_5 = \sum_{(i,j)\in\Omega} \psi_y(i, j) \cdot \psi_y(i, j)$ | 27 |
| | $S_6 = \text{Clip3}\left(-2^{27}, 2^{27} - 1, \sum_{(i,j)\in\Omega} \theta(i, j) \cdot \psi_y(i, j)\right)$ | 28 |
| Motion Refinement Derivation | $v_x = S_1 > 0?\ \text{clip3}(-\text{th}'_{BDOF}, \text{th}'_{BDOF}, -((S_3 \cdot 2^3) \gg \lfloor \log_2 S_1 \rfloor)) : 0$ | 6 |
| | $S_{2,m} = S_2 \gg 12$ | 14 |
| | $S_{2,s} = S_2 \& (2^{12} - 1)$ | 12 |
| | $((v_x S_{2,m}) \ll 12 + v_x S_{2,s})/2$ | 31 |
| | $S_6 \cdot 2^3 - ((v_x S_{2,m}) \ll 12 + v_x S_{2,s})/2$ | 32 |
| | $v_y = S_5 > 0?\ \text{clip3}(-\text{th}'_{BDOF}, \text{th}'_{BDOF}, -((S_6 \cdot 2^3 - ((v_x S_{2,m}) \ll 12 + v_x S_{2,s})/2) \gg \lfloor \log_2 S_5 \rfloor)) : 0$ | 6 |
| Final Bi-Prediction Generation | $v_x \cdot \left(\dfrac{\partial I^{(1)}}{\partial x}(i, j) - \dfrac{\partial I^{(0)}}{\partial x}(i, j)\right)$ | 17 |
| | $v_y \cdot \left(\dfrac{\partial I^{(1)}}{\partial y}(i, j) - \dfrac{\partial I^{(0)}}{\partial y}(i, j)\right)$ | 17 |

FIG. 5 is a flowchart for an example method 300 for predicting a block of video data according to example embodiments. The method shown in FIG. 5 is explained with respect to encoder 100 of FIG. 1 and/or decoder 200 of FIG. 2. However, in other examples, other devices may be configured to perform the method shown in FIG. 5.

In example embodiments, encoder 100 initially encodes, and then subsequently decodes, pictures for use as reference pictures, stored in a reference picture memory, although these steps are not illustrated in the example method of FIG. 5. Encoder 100 then receives a block of video data. The block may be, for example, a prediction unit (PU) of a coding unit (CU) of a current picture (or a slice of the picture) of video data. Encoder 100 may determine which of a variety of prediction modes to use to predict the block, such as intra-prediction or inter-prediction, and if inter-prediction is determined, whether to use uni-directional or bi-directional inter-prediction. In the example method of FIG. 5, encoder 100 determines to predict the block using bi-prediction. For example, encoder 100 may calculate rate-distortion metrics for various possible prediction modes (e.g., one or more intra-prediction modes and uni-directional or bi-directional prediction from the various decoded reference pictures stored in the reference picture memory) and determine that bi-prediction yields the best rate-distortion metrics for the block.

Encoder 100, e.g., motion estimation circuitry 124, may further calculate motion vectors for the block according to bi-prediction. Such motion vectors may refer to a first reference picture to be displayed before the current picture and a second reference picture to be displayed after the current picture. For example, the first reference picture may occur in reference picture list 0 (RefPicList0) and the second reference picture may occur in reference picture list 1 (RefPicList1).

In one embodiment, encoder 100 determines a first POC difference between a POC value for the current picture and a POC value for a first reference picture, to which a first motion vector ($MV_0$) refers, at a first temporal distance $\tau_0$, and a second POC difference between the POC value for the current picture and a POC value for a second reference picture, to which a second motion vector ($MV_1$) refers, at a second temporal distance $\tau_1$. $MV_0$ and $MV_1$ may include a respective x-component and y-component. For example, $MV_0$ may include $MV_{x0}$ and $MV_{y0}$ components, where $MV_{x0}$ describes a horizontal offset and $MV_{y0}$ describes a vertical offset relative to the position of the block in the current picture to determine a position at which to locate a reference block in the first reference picture. Similarly, $MV_1$ may include $MV_{x1}$ and $MV_{y1}$ components, where $MV_{x1}$ describes a horizontal offset and $MV_{y1}$ describes a vertical offset relative to the position of the block in the current picture to determine a position at which to locate a reference block in the second reference picture.

In example embodiments, a first reference picture and a second reference picture are decoded 302. The second reference picture is different than the first reference picture, wherein the first reference picture is displayed before a current picture and the second reference picture is displayed after the current picture. In example embodiments, a first motion vector ($MV_0$) from a current block of the current picture to a first prediction $L_0$ of the first reference picture is determined 304 and a second motion vector ($MV_1$) from the current block to a second prediction $L_1$ of the second reference picture is determined 306. In certain example embodiments, a first motion vector ($MV_0$) from a current block of the current picture to a first prediction $L_0$ of the first reference picture at a first temporal distance ($\tau_0$) from the current picture to the first reference picture is determined and a second motion vector ($MV_1$) from the current block to a second prediction $L_1$ of the second reference picture at a second temporal distance ($\tau_1$) from the current picture to the second reference picture is determined.

Encoder 100 then uses these values to calculate 308 a motion refinement ($v_x$, $v_y$) of a coding unit (CU) by minimizing a difference between the first prediction $L_0$ and the second prediction $L_1$. In example embodiments, first gradient values $$\dfrac{\partial I^{(0)}}{\partial x}(i, j) \text{ and } \dfrac{\partial I^{(0)}}{\partial y}(i, j)$$

for the first prediction $L_0$ and second gradient values $$\frac{\partial I^{(1)}}{\partial x}(i, j) \text{ and } \frac{\partial I^{(1)}}{\partial y}(i, j)$$

for the second prediction $L_1$ are calculated 310. In example embodiments, first gradient values and second gradient values can then be calculated by introducing an additional right shift $I_{grad}$ to lower an internal bit-width of the first gradient values and the second gradient values, as shown in Eq. (6). In example embodiments, calculating 310 the first gradient value and the second gradient value includes calculating a horizontal gradient and a vertical gradient at each of a first prediction position of the first prediction and a second prediction position of the second prediction. Referring to Eq. (6) the horizontal gradient is calculated at each of the first prediction position and the second prediction position, and the vertical gradient is calculated at each of the first prediction position and the second prediction position.

In example embodiments, the value of $(v_x, v_y)$ is calculated using Eq. (1), wherein an additional bit-shift $n_{adj}$ is introduced to a calculation of a plurality of variables $\psi_x(i,j)$, $\psi_y(i,j)$, and $\theta(i,j)$, as shown in Eq. (7), in order to calculate the value of $S_1$, $S_2$, $S_3$, $S_5$, and $S_6$. For example, the value of $S_2$ and $S_6$ are calculated using Eq. (8). In example embodiments, the value of $S_2$ and $S_6$ are calculated by introducing a first clipping operation and a second clipping operation as shown in Eq. (8), wherein $B_2$ is a parameter to control an output dynamic range of $S_2$ and $B_6$ is a parameter to control an output dynamic range of $S_6$. A final bi-prediction of the CU may then be calculated 312 based on the first prediction $L_0$ and the second prediction $L_1$, the motion refinement $(v_x, v_y)$, the first gradient values $$\frac{\partial I^{(0)}}{\partial x}(i, j) \text{ and } \frac{\partial I^{(0)}}{\partial y}(i, j),$$

and the second gradient values $$\frac{\partial I^{(1)}}{\partial x}(i, j) \text{ and } \frac{\partial I^{(1)}}{\partial y}(i, j).$$

In certain example embodiments, the final bi-prediction samples of the CU can then be calculated based on the motion refinement by interpolating the first prediction $L_0$ and/or the second prediction $L_1$ along a motion trajectory, as indicated in Eq. (5). In example embodiments, the summation of the first gradient value and the second gradient value is calculated, wherein an additional right shift is introduced to the summation to lower its bit-width. The difference between the first prediction sample $L_0$ and the second prediction sample $L_1$ is calculated, wherein an additional right shift is introduced to the first prediction sample $L_0$ and the second prediction sample $L_1$ to lower an internal bit-width of the difference.

The example method shown in FIG. 5 represents an example of a method of encoding video data including decoding a first reference picture and a second reference picture, the second reference picture being different than the first reference picture, wherein the first reference picture is to be displayed before a current picture and the second reference picture is to be displayed after the current picture, determining a first motion vector ($MV_0$) from a current block of the current picture to a first reference block of the first reference picture, determining a second motion vector ($MV_1$) from the current block to a second reference block of the second reference picture, and encoding the current block according to bi-directional optical flow (BDOF).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

Further, the above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact examples described above and illustrated in the accompanying drawings, and that various modifications and changes can be made without departing from the scope thereof. It is intended that the scope of the invention only be limited by the appended claims.

What is claimed is:

1. A method for video decoding, comprising:
   determining, for a current block of a current picture, a first prediction corresponding to a first reference picture, wherein the first reference picture is displayed before the current picture;
   determining, for the current block, a second prediction corresponding to a second reference picture, wherein the second reference picture is displayed after the current picture;
   calculating first gradient values for the first prediction and second gradient values for the second prediction;

calculating a respective motion refinement of each subblock of the current block by minimizing a difference between the first prediction and the second prediction based on a motion refinement threshold and a plurality of internal parameters representing different summation characters of the first prediction and the second prediction; and calculating a final bi-prediction of the current block based on the first prediction, the second prediction, respective motion refinements, the first gradient values and the second gradient values, wherein calculating the final bi-prediction of the current block comprises:

calculating the final bi-prediction of the current block based further on a fourth right shift value for combining the first prediction and the second prediction.

2. The method of claim 1, wherein calculating a respective motion refinement of each subblock of the current block by minimizing a difference between the first prediction and the second prediction comprises:

calculating a horizontal summation by adding a first horizontal gradient and a second horizontal gradient, and calculating a vertical summation by adding a first vertical gradient and a second vertical gradient, wherein a first right shift value is introduced into the horizontal summation and the vertical summation for lowering a bit-width of each of the horizontal summation and the vertical summation; and calculating a respective motion refinement of each subblock of the current block based on the horizontal summation and the vertical summation.

3. The method of claim 1, wherein a second right shift value is introduced into the calculation of the first gradient values for the first prediction and the calculation of the second gradient values for the second prediction.

4. The method of claim 1, wherein calculating a respective motion refinement of each subblock of the current block by minimizing a difference between the first prediction and the second prediction comprises: clipping a horizontal motion refinement and a vertical motion refinement in the respective motion refinement to a range of $[-th_{BDOF}, th_{BDOF}]$, wherein $th_{BDOF}$ is a motion refinement threshold, and wherein the respective motion refinement comprises the horizontal motion refinement and the vertical motion refinement.

5. The method of claim 1, wherein a third right shift value is introduced into the calculation of the difference between the first prediction and the second prediction.

6. The method of claim 1, wherein calculating the first gradient values for the first prediction and the second gradient values for the second prediction further comprises calculating a horizontal gradient and a vertical gradient at each of a first prediction position of the first prediction and a second prediction position of the second prediction.

7. The method of claim 1, wherein the fourth right shift value comprises an additional right shift value, and wherein the additional right shift value is set to be equal to a bit-depth of a video for decoding.

8. The method of claim 1, wherein the first prediction is determined based on a first motion vector from the current block to the first reference picture, and wherein the second prediction is determined based on a second motion vector from the current block to the second reference picture.

9. A computing device, comprising:
one or more processors;
a non-transitory storage coupled to the one or more processors; and
a plurality of programs stored in the non-transitory storage that, when executed by the one or more processors, cause the computing device to perform acts comprising:

determining, for a current block of a current picture, a first prediction corresponding to a first reference picture, wherein the first reference picture is displayed before the current picture;

determining, for the current block, a second prediction corresponding to a second reference picture, wherein the second reference picture is displayed after the current picture;

calculating first gradient values for the first prediction and second gradient values for the second prediction;

calculating a respective motion refinement of each subblock of the current block by minimizing a difference between the first prediction and the second prediction based on a motion refinement threshold and a plurality of internal parameters representing different summation characters of the first prediction and the second prediction; and calculating a final bi-prediction of the current block based on the first prediction, the second prediction, respective motion refinements, the first gradient values, and the second gradient values, wherein calculating the final bi-prediction of the current block comprises:

calculating the final bi-prediction of the current block based further on a fourth right shift value for combining the first prediction and the second prediction.

10. The computing device of claim 9, calculating a respective motion refinement of each subblock of the current block by minimizing a difference between the first prediction and the second prediction comprises:

calculating a horizontal summation by adding a first horizontal gradient and a second horizontal gradient, and calculating a vertical summation by adding a first vertical gradient and a second vertical gradient, wherein a first right shift value is introduced into the horizontal summation and the vertical summation for lowering a bit-width of each of the horizontal summation and the vertical summation; and calculating a respective motion refinement of each subblock of the current block based on the horizontal summation and the vertical summation.

11. The computing device of claim 9, wherein a first right shift value is introduced into the calculation of both the first gradient values for the first prediction and the calculation of the second gradient values for the second prediction.

12. The computing device of claim 9, wherein calculating a respective motion refinement of each subblock of the current block by minimizing a difference between the first prediction and the second prediction comprises: clipping a horizontal motion refinement and a vertical motion refinement in the respective motion refinement to a range of $[-th_{BDOF}, th_{BDOF}]$, wherein $th_{BDOF}$ is a motion refinement threshold, and wherein the respective motion refinement comprises the horizontal motion refinement and the vertical motion refinement.

13. The computing device of claim 9, wherein a second right shift value is introduced into the calculation of the difference between the first prediction and the second prediction.

14. The computing device of claim 9, calculating the first gradient values for the first prediction and the second gradient values for the second prediction further comprises calculating a horizontal gradient and a vertical gradient at each of a first prediction position of the first prediction and a second prediction position of the second prediction.

15. The method of claim 9, wherein the fourth right shift value comprises an additional right shift value, and wherein the additional right shift value is set to be equal to a bit-depth of a video for decoding.

16. The computing device of claim 9, wherein the first prediction is determined based on a first motion vector from the current block to the first reference picture, and wherein the second prediction is determined based on a second motion vector from the current block to the second reference picture.

17. A non-transitory computer readable storage medium storing a plurality of programs for execution by a computing device having one or more processors, wherein the plurality of programs, when executed by the one or more processors, cause the computing device to perform operations to process a video bitstream and store the processed video bitstream in the non-transitory computer readable storage medium, the operations comprising:
   determining, for a current block of a current picture, a first prediction corresponding to a first reference picture, wherein the first reference picture is displayed before the current picture;
   determining, for the current block, a second prediction corresponding to a second reference picture, wherein the second reference picture is displayed after the current picture;
   calculating first gradient values for the first prediction and second gradient values for the second prediction;
   calculating a respective motion refinement of each subblock of the current block by minimizing a difference between the first prediction and the second prediction based on a motion refinement threshold and a plurality of internal parameters representing different summation characters of the first prediction and the second prediction; and
   calculating a final bi-prediction of the current block based on the first prediction, the second prediction, respective motion refinements, the first gradient values and the second gradient values, wherein calculating the final bi-prediction of the current block comprises:
      calculating the final bi-prediction of the current block based further on a fourth right shift value for combining the first prediction and the second prediction.

18. The storage medium of claim 17, wherein calculating a respective motion refinement of each subblock of the current block by minimizing a difference between the first prediction and the second prediction comprises:
   calculating a horizontal summation by adding the first horizontal gradient and the second horizontal gradient, and calculating a vertical summation by adding the first vertical gradient and the second vertical gradient, wherein a first right shift value is introduced into the horizontal summation and the vertical summation for lowering a bit-width of each of the horizontal summation and the vertical summation; and
   calculating a respective motion refinement of each subblock of the current block based on the horizontal summation and the vertical summation.

\* \* \* \* \*